July 20, 1965
M. L. BARKHAU
3,195,501
APPARATUS FOR SPRAY COATING GLASSWARE
Filed Feb. 20, 1961
4 Sheets-Sheet 4
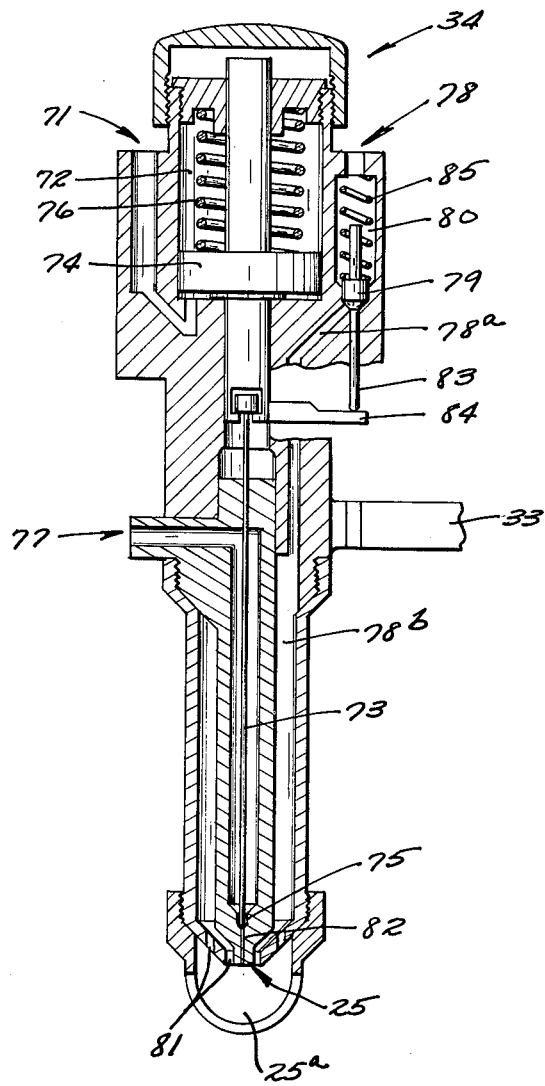
INVENTOR.
MARVIN L. BARKHAU
BY J. R. Nelson
and W. A. Schaich
Attorneys United States Patent Office 3,195,501
Patented July 20, 1965

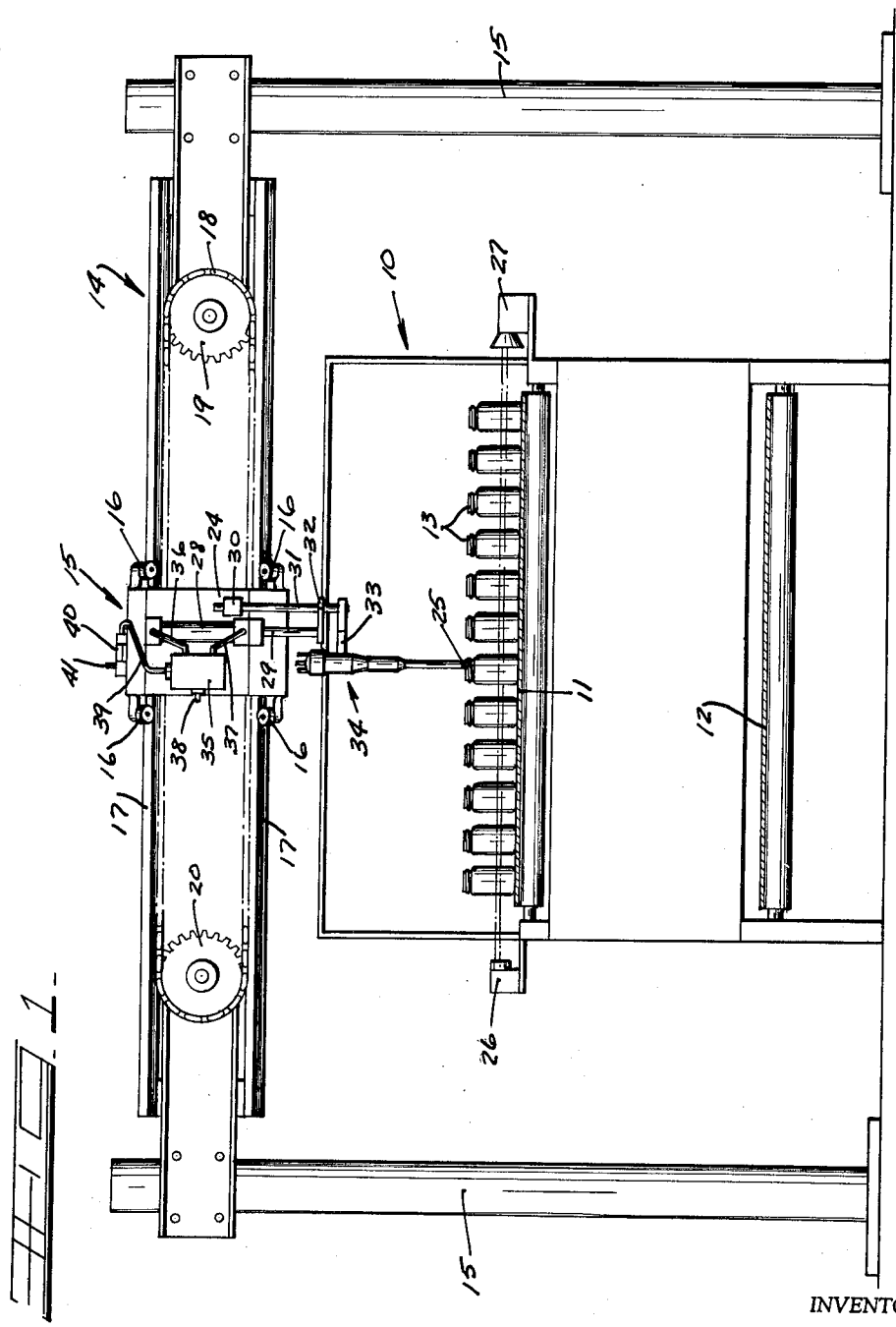

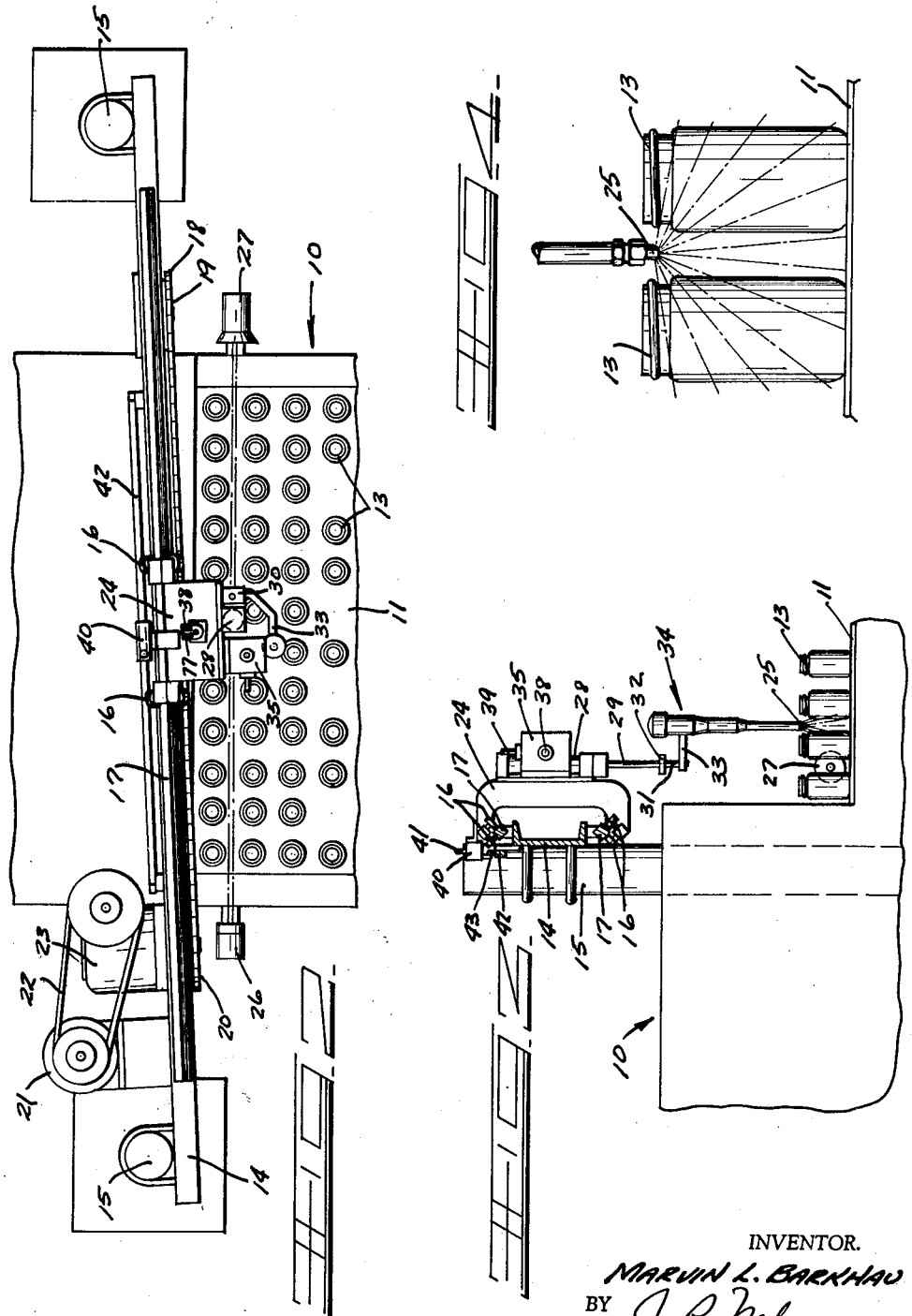

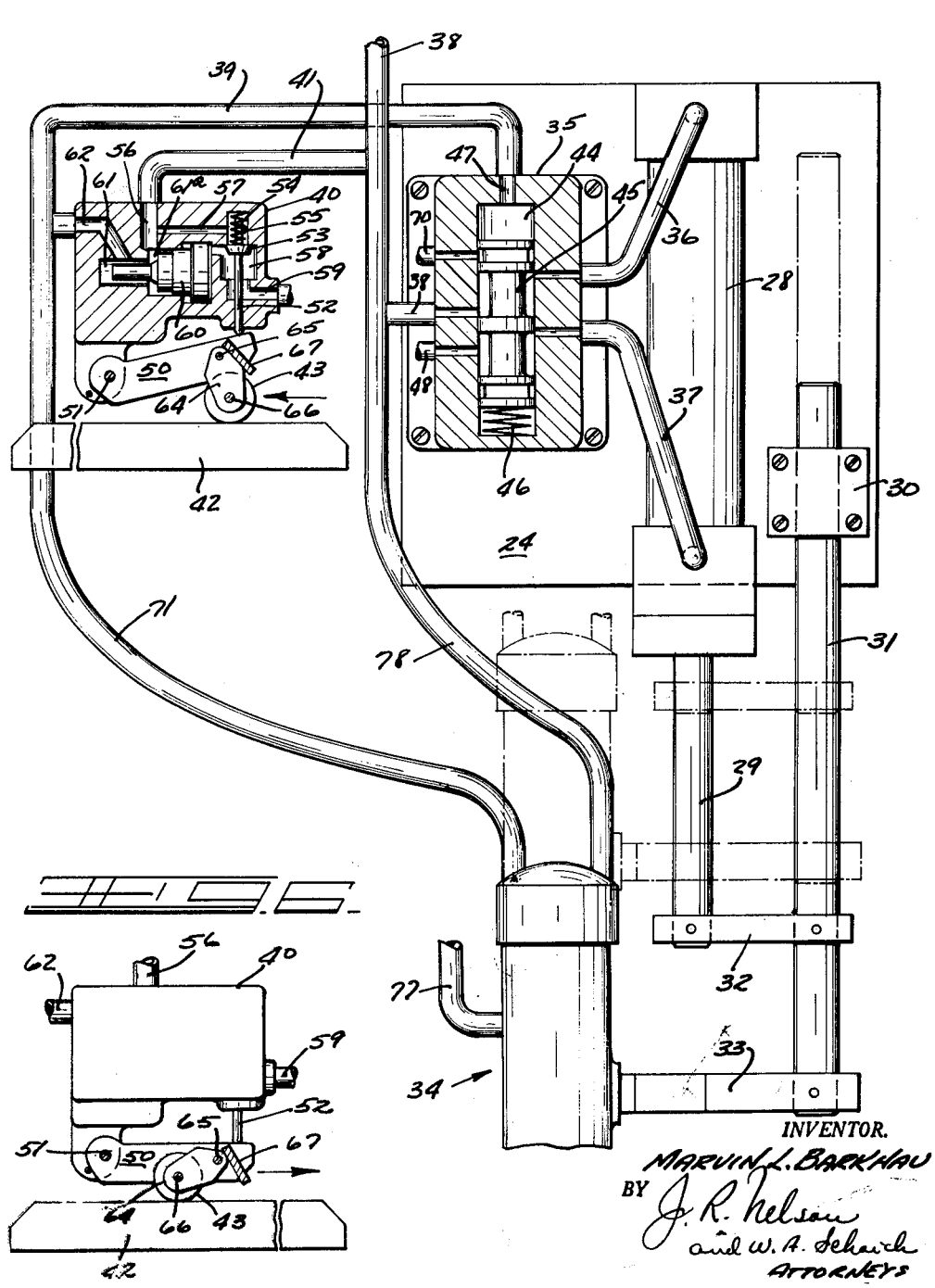

3,195,501
APPARATUS FOR SPRAY COATING
GLASSWARE
Marvin L. Barkhau, Elmore, Ohio, assignor to Owens-Illinois Glass Company, a corporation of Ohio
Filed Feb. 20, 1961, Ser. No. 90,355
7 Claims. (Cl. 118—323)

The invention relates to the art of surface treatment of articles, such as glass containers, that are continuously supplied and advanced in oriented fashion on a conveyor by an efficient and inexpensive automatic production process of treatment thereof. More particularly, the invention constitutes an improvement over the invention disclosed in U.S. Patent 2,925,801 of Bivens and Schaefer.

The Bivens et al. apparatus of their above-cited patent has been employed for the application of solutions of surface coating materials, such as emulsions of silicone resins or polyethylene waxes, in surface coating the overall external surface of glass containers. The mechanism employed by the Bivens et al. machine is adapted mainly for spray coating the containers by a spray head as it moves along two rows of glassware at a level somewhat above the rims of the containers and while moving, projects therefrom a downwardly directed confined conical spray of the treating solution. This spray must, by its conical zone of application, be applied in a downwardly directed line of emission from the spray head and yet, retain the advantage of preventing any mist or spray of the material from penetrating the inner surfaces of the glassware. This latter requirement is very essential in the industry in order to comply with federal food and drug administration regulations requiring that for certain surface treating agents none be admitted interiorly of a container which is to ultimately package a condiment or food or edible commodity. Therefore, in the industry this requirement is very rigid and adjustments in the machine to obtain a better control over the application of the external coating must be made with great care and accuracy in order to produce a marketable container that is within the public protection of the food and drug regulations.

Perhaps equally or more important is the further requirement in certain types of ware that the finish or rim portion of the container be free of surface treating material that will affect the sealing properties or application of the seal on the container. If the finish or rim of the container is treated with a coating material, this has been found to deleteriously affect the sealing property of an adhesively applied seal member or diaphragm that is applied onto the rim. This seal member must make an hermetic sealing contact with the rim and is disposed over the mouth of the container between the rim and the closure member.

The present invention, therefore, provides as an improvement a process and machine by which the surface treating material may be applied in the same efficient and continuous manufacturing process and the coating level on the container is closely controlled to a point thereon that is most advantageous to overcome the above-referred to problems.

In keeping with this objective, it is the purpose of this invention to provide a method and apparatus for treating glassware with a liquid form of a material as an emulsion or solution of a surface treatment agent, such as a silicone resin or polyethylene wax, that is applied in a mist form wherein the level of application on the container may be closely controlled in relation to the rim at the open mouth of the container and internal penetration of this material will be avoided.

It is also an object of this invention to treat glass containers in this manner so that the coating material is applied to it over only a selected portion of its external surface, such as to the exclusion of its external neck or finish portion, and in so doing to effect production of a coated container that is capable of receiving a satisfactory seal and closure by applying the coating only where it is most functional and further by applying it to assure that none of the material is admitted onto the rim or interiorly of the container so as to not contaminate either the rim or the container interior.

Another object of the invention is the provision of a procedure for spray coating glass containers in accordance with the foregoing wherein a spray emitting means is lowered and moved between adjacent rows of containers through the length of the rows at a level below the upper rim of the container and thereafter raised above the rim level and returned to the point of origin for repetition of the cycle at such a time when the container rows are sufficiently advanced by one increment to again permit moving the spray means between two different adjacent rows.

A further object of the invention is to provide apparatus for performing the foregoing procedure repeatedly and automatically.

The specific nature of this invention, as well as other objects and advantages thereof, will become apparent to those skilled in the art from the following detailed description, taken in conjunction with the annexed sheets of drawings, on which, by way of preferred example only, is illustrated one embodiment of the invention.

In the drawings:

FIG. 1 is a front elevational view of the spray applying apparatus of the invention showing the spray head in its operative spraying position during an active segment of a cycle thereof for treating glassware;

FIG. 2 is a plan view of the spray applying apparatus of the invention shown on FIG. 1;

FIG. 3 is a side elevational view of the spray applying apparatus of the invention shown on FIGS. 1 and 2;

FIG. 4 is a side elevational view of the containers in relation to the spray nozzle, as shown on FIG. 3;

FIG. 5 is a schematic diagram of the fluid circuits for controlling the operation of the spray head shown in their setting for the operating segment of the cycle;

FIG. 6 is a side view of the pilot valve of the fluid circuit control shown in its relation to the control cam during the final or return segment of the cycle; and FIG. 7 is a schematic representation in section of the construction of the spray nozzle and its control means for turning the spray on and off.

Basically, the invention employs the procedure for continuous surface treatment of glass containers which have a mouth end opening defined by a rim of the container. These containers are continuously advanced on a conveyance with their rims upright and the several containers are arranged in substantially spaced apart rows that are disposed laterally of the conveyance in respect to its direction of movement. The conveyance carries the rows of containers past a transverse spray applicator that is traveled in a path through a reciprocating cycle starting at one end of the rows of containers to the opposite end of the rows and returned. During the outgoing or first segment of the cycle, the spray applicator is carried in the space between two rows of the containers and is lowered to a level extending below the rims of finish portion of the containers and thereat activated to emit a spray or mist of the coating material in a substantially 180° vertical fan-shaped pattern or zone of a mist of the material. The level of the upper end of the fan-shaped pattern will be adjusted to coincide with a particular level on the containers, such as at a line below the neck finish or rim portion thereof. At the completion of the first segment of the cycle, the spray applicator is concurrently deactivated, raised above the level of the rims and returned in the final segment of the cycle to the point of origin. This cycle is repeated in sequence for each advance of a new row of containers up to the spray path.

Referring more specifically to the drawings, there is shown on FIG. 1 an annealing lehr 10 which includes a continuous conveyor belt having an upper reach 11 and a lower reach 12 thereof. As is conventional in this piece of equipment, the two reaches 11 and 12 of the conveyor are as a continuous endless belt driven to travel around end pulleys and guides to carry the containers 13 that are loaded in transverse rows at one end of the lehr 10 to the opposite or unloading end thereof. It is while these rows of containers 13 are traveling through a portion of the lehr 10 that they are most advantageously treated with the surface coating material in accordance with the present invention. In applying this treatment, a spray head support, referred to generally at 14, is supported on vertical standards 15 located generally transversely at opposite sides of the lehr 10.

With a brief reference to FIG. 2, the support 14 may be arranged at an angle with respect to the path of conveyance defined by the advancing upper conveyor reach 11 of the lehr. This angular adjustment compensates for the forward displacement of the rows of containers during the traversing displacement of the spray head across the support 14 and can be arranged or adjusted to meet any particular speed requirement of the two. As will appear hereinafter, the spray nozzle is to be moved in the space between two rows of the containers 13 on the lehr conveyor 11. Therefore, if for a given rate of travel per unit of time of the conveyor, and a given rate of travel of the spray nozzle in its path per unit of time, the angular relation of support 14 to the transverse rows of containers 13 will be calculated from the sine of the angle established between the support and the container rows. The sine of this angle will equal the conveyor travel rate divided by the nozzle travel rate. Therefore, if the conveyor rate is greater than the spacing between two rows of the containers for the time necessary for the spray nozzle to make a complete transverse run of the length of the container rows, the angular relationship between the support 14 and the container rows will need adjustment so that the nozzle, when in a lowered spraying position below the level of the container rims, may travel freely within the space without interfering contact with the containers.

Referring again to FIG. 1, a spray head assembly 15 is carried on the support 14 by rollers 16 which are rollable on auxiliary guides 17 (FIG. 3) that are rigidly fastened on the support 14. The spray head assembly 15 is driven in reciprocating movement within the extremities of the horizontal members 17 on the support 14 by a continuous chain 18 reeved about lateral spaced sprockets 19 and 20 which are mounted at opposite ends of the support 14. A drive means (FIG. 2) is mounted on the horizontal support 14 and comprises an electric motor 21 which operates through a drive connection 22 to a speed reducer 23 and the latter has an output shaft connected to drive the sprocket 20. The sprocket 20, therefore, drives the chain 18 continuously in one direction while the motor 21 is operated. The chain is connected to drive the spray head assembly 15 to effect a transverse movement thereof to and fro along the advancing rows of the container in the path defined by the horizontal support 14. The chain effects this movement of the spray head assembly by means of a lug link (not shown) projecting from the outer periphery of the continuous chain, as is more fully structurally disclosed on the aforementioned patent of Bivens et al. This lug in the chain projects upward when the lug link thereof is in the upper path of travel of the chain between the two end sprockets 19 and 20 and projects downward when on the bottom path of travel of the chain between the two sprockets. The carriage support member 24 of the assembly 15 has on its back surface adjacent the chain two spaced fingers or projections (not shown) so arranged as to be engaged by the lug of the chain alternatively during travel of the lug in the respective upper and lower spans of the chain between the sprockets 19 and 20. To state this more specifically, one projection on the carriage 24 is engaged to move it in one direction when the lug projects down and the other projection on the carriage is engaged to move it in the other direction when the lug projects up. In this fashion reciprocating travel of the spray head assembly is accomplished with a single drive source as the lug proceeds in the endless path of travel of the chain about outer periphery thereof.

The drive means for the chain is controlled such that the spray head is moved through a reciprocating cycle of travel beginning when the spray nozzle 25 of the assembly 15 is aligned with the space between two rows of the containers 13 on the conveyor 11. This is accomplished by having a light source 26 positioned at one side of the conveyor 11 to direct a beam of light transversely across the conveyor to a photoelectric cell 27 positioned at the opposite side of the conveyor. The photoelectric cell initiates a flow of electric current which initiates the drive means and effects the transverse travel of the spray head assembly 15. The arrangement is controlled such that the spray head assembly has a starting position at one end of the horizontal support 14. One cycle of reciprocation in the operation is defined by the progression of the spray head assembly 15 across the conveyor and returned to the starting position. The electric eye arrangement initiates a sequence of transverse travel of the spray head assembly 15 when the cell 27 receives an uninterrupted beam of light, but only if such uninterrupted beam of light has been preceded by an interruption of said beam by the passage of a row of the containers 13. The particular electrical control for said drive means to achieve such cyclical operation is more fully described in the aforementioned Patent 2,925,801, as schematically illustrated therein on FIG. 8. The angular displacement of the horizontal support 14, as discussed earlier herein, allows the spray nozzle 25 to advance in the same direction as the containers 13 being carried on the conveyor 11 and at substantially the same rate as the containers in their direction of conveyance, and in the meanwhile the nozzle is simultaneously passing transversely in the space between rows in a path lying equidistant from the two adjacent rows of the containers.

Referring now to FIGS. 1, 3 and 5, the spray head assembly will be more particularly described. The carriage member 24 includes a means for mounting the rollers 16 for rollable engagement on the auxiliary guide 17 along the support 14. On the carriage 24 is fastened a cylinder-piston motor 28 which includes a piston and downwardly depending piston rod 29. Also on carriage 24 is a guide 30 which is rigidly attached to receive a guide rod 31. The guide rod has a lateral bracket 32 fastened thereon and in turn fastened to the end of the piston rod 29. At the end of the guide rod 31 is a mounting bracket 33 which is attached to the body portion of the spray head 34. The spray head 34 includes a downwardly projecting body that terminates in a lower dependent spray nozzle, previously referred to as 25. On the carriage 24 is a motor control valve 35 which has fluid connections 36 and 37 respectively connected to the opposite end ports of the cylinder of motor 28. The motor control valve 35 has an inlet connection 38 extending from a supply of fluid pressure (not shown). The motor control valve also has a fluid connection 39 extending from the outlet of a pilot valve 40. The pilot valve 40 has its inlet connected at a branch line 41 from the fluid pressure source. At the backside of the support 14 is a cam rail 42 (FIGS. 2 and 3) which is attached in a position for engagement with the cam-follower roller 43 of the pilot valve 40.

Referring now to FIG. 5, the motor control valve 35 includes a cylindrical valve chamber 44 wherein a valve spool 45 is shiftable axially in opposite directions between alternative settings by pilot pressure supplied through the connection with line 39 at the port 47 and a biasing spring 46. As shown on the drawings, the pilot pressure applied at the port 47 will shift the valve spool 45 to admit the fluid pressure from line 38 through the valve chamber 44 and into the passage connected to the conduit 36 leading to the upper end of the motor cylinder 28. The fluid pressure will thereby force the piston of the motor downwardly and drive the spray head 34 to its lowered position whereat the tip end of the spray nozzle 25 will be in a position below the rim of the containers 13, such as is shown on FIG. 4. Fluid from the lower end of cylinder 28 is exhausted through the conduit 37 into the valve chamber 44 and to the lower exhaust port 48 of the valve 35. This setting of the valve 35 is automatically attained through the pilot valve 40 while the cam-follower roller 43 moves on the cam 42 in the one direction. As shown on the drawings, this direction of movement of the pilot valve cam-follower is the result of the spray head assembly being driven from right to left on FIG. 1, 2 and 5. The pilot valve 40 has an arm 50 attached by pivot pin 51 which allows the arm pivotal movement in either direction. As the arm is moved counterclockwise on FIG. 5, it engages a valve stem 52 of the pilot valve which shifts its valve member 53 upwardly against the biasing force of a spring 54 and thereby closes off the opening of chamber 55. Chamber 55 is connected to the inlet port 56 of the valve 40 by a passage 57. When the valve member 53 is in a lowered position so as to open the chamber 55, the pressure admitted through line 41 is transmitted through the inlet 56, passage 57 and chamber 55 into the lower chamber 58. This ultimately seats the valve member 53 in the opening of the passage 59 and the pressure therein will bear against an axially shifted valve piston 60 in the stepped chamber 61. As this piston 60 is shifted to the left on FIG. 5, it closes the connection between the inlet port 56 and the chamber 61, the latter being connected with the outlet port 62 of the pilot valve which is connected with the pilot pressure line 39 for the motor control valve. The arm 50 of the pilot valve has a roller bracket 64 pin connected thereon at 65 for pivotal movement in opposite directions. The bracket 64 is a yoke-shaped member which receives the roller 43. The latter is rotatably mounted in the bracket 64 by the axle 66. A stop member 67 is rigidly connected on the arm 50 and located to engage the bracket 64 and limit its rotary movement in the counterclockwise direction on FIGS. 5 and 6.

Thus, assuming that the spray head assembly 15 is in its starting position at the right-hand side of FIG. 1, as it begins its movement to the left under the drive of the chain 18, the cam roller 43 will be moved up into the cam 42 as shown on FIG. 5. In so doing, the bracket 64 will initially yield somewhat by pivoting counterclockwise until it engages the stop member 67. Thereafter, as the cam roller rides onto the cam, a vertical motion will be transmitted to the arm 50 which in turn will raise the valve stem 52 and seat the valve member 53 closing the passage 55. The chamber 58 is then free to exhaust through passage 59 and the continuous pressure supplied to the stepped annular region 61a of chamber 61 through line 41 into port 56, will shift the piston 60 to the right. In so doing, the chamber 61 is connected with the outlet port 62 and fluid pressure is transmitted into the interconnecting conduit 39. The pressure in line 39 then is applied to the motor control valve 35 to shift its spool member 45 into the position shown. As explained earlier, this valve setting operates the motor 28 to lower the spray head 34 into the position shown on FIG. 4. The cam roller 43 rides on the cam 42 continuously throughout the travel in the one direction for traversing the rows of containers 13. As the carriage 24 and the pilot valve 40 reach the reversing point for the final return segment of the cycle, the cam roller 43 will pass off the far end of the cam 42. This will cause the roller to drop and the spring in the pilot valve will force the valve 53 and stem 52 downwardly to disconnect the inlet and outlet ports of the pilot valve and disconnect pilot pressure in line 39. At this point, the spring 46 in the motor control valve will shift its valve spool 45 to the other setting whereby fluid pressure admitted in line 38 will be applied to conduit 37 connected to the lower end of the motor cylinder and the upper end of the cylinder will be connected through line 36 to the exhaust port 70. As the carriage 24 reverses its travel in the direction from left to right on FIG. 1, the cam roller 43 will then roll back up onto the high part of cam 42, however, in this direction of movement, as shown on FIG. 6, the bracket 64 will be permitted to pivot freely in the clockwise direction. Thus, the valve stem 52 will not be affected by the cam and the pilot valve will remain set in the off position for the entire return segment of the cycle to the point where the carriage 24 assumes the original or starting position.

One further control is provided by the above described mechanism. The pilot valve outlet port 62 has a T-connection through a fluid line 71 to the control cylinder 72 of the spray head 34. As shown on FIG. 7, the spray head 34 is controlled on and off by an axial needle valve 73 which is shiftable axially by a piston 74. The needle valve 73 fits in a valve seat 75 to close off the openings of the nozzle 25 and render it inactive. The needle valve is set in this off position by a spring 76 biasing the piston 74. The needle valve is moved from its seat by upward movement of the piston 74 under fluid pressure admitted through line 71. Thus, as pressure is applied in line 71, the valve for the spray nozzle is opened and the nozzle is turned on to emit a spray of liquid furnished through the line 77 extending from a source of material for the spray application through the hollow passage to the seat member 75 (not shown). The liquid in the line 77 is atomized and emitted in the form of a mist by having fluid pressure, such as compressed air, piped into the spray head at line 78. This fluid pressure is concomitantly controlled on and off with the liquid valve 73, 75 by a valve member 79 in a chamber along the line 78. The line 78 extends as hollow passage 78a and 78b into the nozzle 25 whereat openings 81 admit the air to the nozzle chamber 25a to mix with and atomize the liquid material admitted therein through the axial passage 82. The stem 83 of the valve member 79 is connected to a bracket 84 on piston 74. The valve member 79 is biased in chamber 80 by a spring 85. When pressure is admitted to line 71 to raise piston 74, the valve 79 is also lifted and the air in line 78 is connected to nozzle chamber 25a at the same time needle valve 73 is lifted to connect liquid material in line 77 to chamber 25a. The nozzle is thereby rendered active. When the line pressure in 71 is shut off, springs 76 and 85 render the nozzle inactive.

Thus, as the spray head assembly is operated in accordance with the foregoing description, the nozzle 25 when lowered to its spraying position 34 is constructed to emit a substantially vertical 180° fan-shaped zone of a mist spray of the liquid material that is furnished through the line 77 into the spray head unit 34. This particular spray, as shown in FIG. 4, may also be described as a substantially semicircular shaped zone which will emit in opposite directions and onto the two parallel rows of containers past which the spray nozzle 25 is carried in the space therebetween in its spraying path over the first segment of the above-described reciprocating cycle of the mechanism.

It should be readily apparent from the above description that one of the unique features of the present invention is the provision of a fully automatic system in which a control is provided for lowering the spray nozzle to a spraying position and initiating its spraying operation through the control provided by the pilot valve. Obviously, individual control could be employed for these functions. However, it is believed the single control feature through the use of one cam control obtains certain advantages in assuring simultaneous positioning of the spray nozzle and activating it.

The invention has been demonstrated to possess utility especially in applying the more recent surface treating agents for glass containers which include aqueous solutions or emulsions of silicone resin or polyethylene wax. The functional advantages of such treatments are known to reside in the increased scratch resistance of the glassware which promulgates its life and endurance. In such applications it has been found generally desirable to bring the surface temperature of the glassware to about 400° F. just prior to the application of the material. Examination of the glass containers bearing the coating of the materials mentioned as applied by the use of the present invention reveals that a very uniform distribution of the coating results and that the control of the level of such coating has been very satisfactory. It is, therefore, possible by the present invention to achieve the objects and a cost saving in material, increases in efficiency of operation, and elimination of contamination of the ware that might otherwise arise in spray application.

While a preferred embodiment of the present invention has been herein specifically described, other embodiments and variations may occur to those skilled in the art after a knowledge of the disclosure herein, and it is desired to include within the scope of the patent granted hereon all such embodiments and variations, and more particularly as comprehended by the appended claims.

I claim:

1. In a spray mechanism for spray coating open mouth, hollow articles arranged in upright fashion in plural transverse rows on a slow moving conveyor, the combination comprising a transverse overhead carriage, a spray head assembly movable along said carriage, drive means connected to said carriage for reciprocally and cyclically moving said assembly in controlled fashion in a horizontal path along said carriage for treating said hollow articles, said assembly comprising a spray nozzle constructed to emit a downward substantially 180° fan-shaped zone of a spray of the coating material, a reversible motor, means connecting said nozzle and said motor for moving the nozzle between a lowered spraying position whereat the nozzle is at a level lower than the top edge of the open-mouthed articles and a retracted position whereat the nozzle is raised above the open-mouthed articles, said drive means for said assembly moving the nozzle in one direction along said horizontal path between two adjacent rows of said articles, control means for said motor for lowering the spray nozzle to spraying position in response to movement of the spray mechanism along said carriage by said drive means in the said one direction of movement between the two adjacent rows of said articles and raising the spray nozzle to retracted position in the other direction of movement, and means to activate the spray nozzle for spraying a coating material in response to its being lowered to the spraying position, said last-mentioned means rendering the spray nozzle inactive in response to its being raised to retracted position.

2. A spray mechanism comprising a spray nozzle assembly including a downwardly directed nozzle constructed to emit a substantially vertical, semicircular zone of a spray of material, a cylinder-piston fluid-operated motor, means connecting the piston of said motor and said nozzle, a fluid pressure supply means connected to opposite ends of the cylinder of said motor, a control valve connected in said last mentioned means for controlling the reversible operation of the motor, a cam surface, a cam-operated pilot valve including a cam-follower relatively movable in opposite directions along said cam, means adapted for connecting a pilot pressure fluid to the pilot valve, means connecting the pilot valve to the control valve for operation of the latter by pilot pressure fluid, said cam follower including a variable linkage means pivotally connected on said pilot valve and movable different distances with respect to said valve before effecting operation of the latter in response to the opposite directions of relative movement of the cam follower on the cam so that relative movement of the cam on the cam-follower in one direction regulates the motor control valve to shift the nozzle in one direction and relative movement of the cam on the cam-follower in the other direction regulates the motor control valve causing the nozzle to be shifted in the opposite direction.

3. The mechanism of claim 2, wherein said pilot valve comprises an inlet port and an outlet port, the means adapted for connecting pilot pressure fluid to said pilot valve comprises a fluid conduit connected to said inlet port for providing fluid under pressure to said pilot valve, a fluid conduit connected between said outlet port and the motor control valve, a valve passage between said inlet and outlet ports, a shiftable valve means adapted to normally close said passage, a valve stem operatively connected for actuating said valve means, an arm connected for operating said valve stem and mounted for movement in opposite directions, a pivoted link on said arm for mounting said cam-follower, and a stop for engaging said link that is engageable with the latter in its pivotal movement in one direction to limit that movement, whereby the cam-follower will shift the valve stem to open said passage of the pilot valve during one direction only of relative movement of the cam follower on the cam.

4. The mechanism of claim 2, wherein said control valve is normally set for moving the nozzle in the said opposite direction, and said pilot valve being operated by the cam and cam-follower moving relatively in the said one direction thereby connecting pilot pressure fluid to the control valve for operating it and effect moving the nozzle in the said one direction.

5. The mechanism of claim 2, wherein the spray nozzle includes a means for supplying a liquid material and means for supplying a pressure fluid, the fluid pressure causing an emission of the liquid from the nozzle in form of a mist, and wherein the nozzle includes a normally-closed valve means, a fluid-operated valve means actuator, a connection of said actuator to said pressure fluid supply means which extends through the pilot valve, the latter operating said actuator in response to shifting movement of the nozzle to effect connecting and disconnecting said fluid pressure and liquid material to said nozzle for regulating said mist emission on and off, said emission being on when the nozzle is shifted in said one direction.

6. Apparatus for applying a surface treatment to only the outer surface of open-mouth glass containers or the like supported on a conveyor and continuously advanced thereby with the mouth portion of the containers upright and the several containers arranged thereon in transversely aligned rows comprising a spray head support horizontally spanning the row of containers to define a horizontal path, a spray head carriage mounted for movement on said support along said path, a spray head unit on said carriage comprising a spray nozzle adapted to emit a downwardly projected, substantially semicircular, spatially confined zone of a mist of a treating liquid, a reciprocating motor drive means, means connecting the nozzle and said drive means for moving the nozzle relative to the carriage between a spraying position whereat the said confined zone of mist applied by the nozzle is below the mouth defining rim of the container and a retracted position remote from said spraying position, a drive means connected to said carriage for cyclically moving the latter in controlled reciprocating fashion in said horizontal path for treating said containers, whereby movement of the nozzle in the one direction along said horizontal path will be between two adjacent rows of containers, means for controlling the operation of said reciprocating drive means so that the nozzle is moved into spraying position responsive to said carriage movement in said one direction and the nozzle is moved to its retracted position responsive to return movement of the carriage to the end of the said cycle.

7. Apparatus for applying a surface treatment to only the outer surface of open-mouth glass containers supported with their mouth defining rims upright in transversely aligned rows and continuously advanced by a conveyor, comprising an overhead spray head support horizontally spanning the conveyor, a spray head carriage connected on said support for movement thereon, drive means for moving said carriage from one end of the container rows to the other end thereof and thence back to the starting position, a spray head mounted on said carriage comprising a spray nozzle, a reciprocating motor drive means, means connecting the nozzle and said reciprocating drive means for moving the nozzle relative to the carriage between a lowered spraying position whereat the nozzle extends below the container rims and a raised retracted position above said rims, automatic means controlling the drive means for moving said carriage in a predetermined sequence automatically so that in movement in one direction the nozzle is carried between container rows, cam means on said support, a cam-follower on said carriage and engageable with said cam means, a source of fluid under pressure, a fluid-operated control means normally set for operating said reciprocating drive means to raise the nozzle, a pilot valve operable by said cam and cam-follower during movement in said one direction only, and means connecting the fluid pressure source to said control means through said pilot valve for operating said reciprocating drive means to lower the nozzle during movement of said carriage in said one direction to thereby place the nozzle in spraying position for treatment of the adjacent container rows during travel in that direction.

References Cited by the Examiner

UNITED STATES PATENTS

| | | | |
|---|---|---|---|
| 2,428,292 | 9/47 | Queen | 118—306 |
| 2,840,037 | 6/58 | Verba | 118—323 X |
| 2,900,950 | 8/59 | Peeps | 118—323 X |
| 2,925,801 | 2/60 | Bivens | 118—2 |
| 2,926,101 | 2/60 | Schaefer | 118—323 X |
| 2,955,565 | 10/60 | Schotland | 118—7 |

RICHARD D NEVIUS, *Primary Examiner.*